Figure 1:
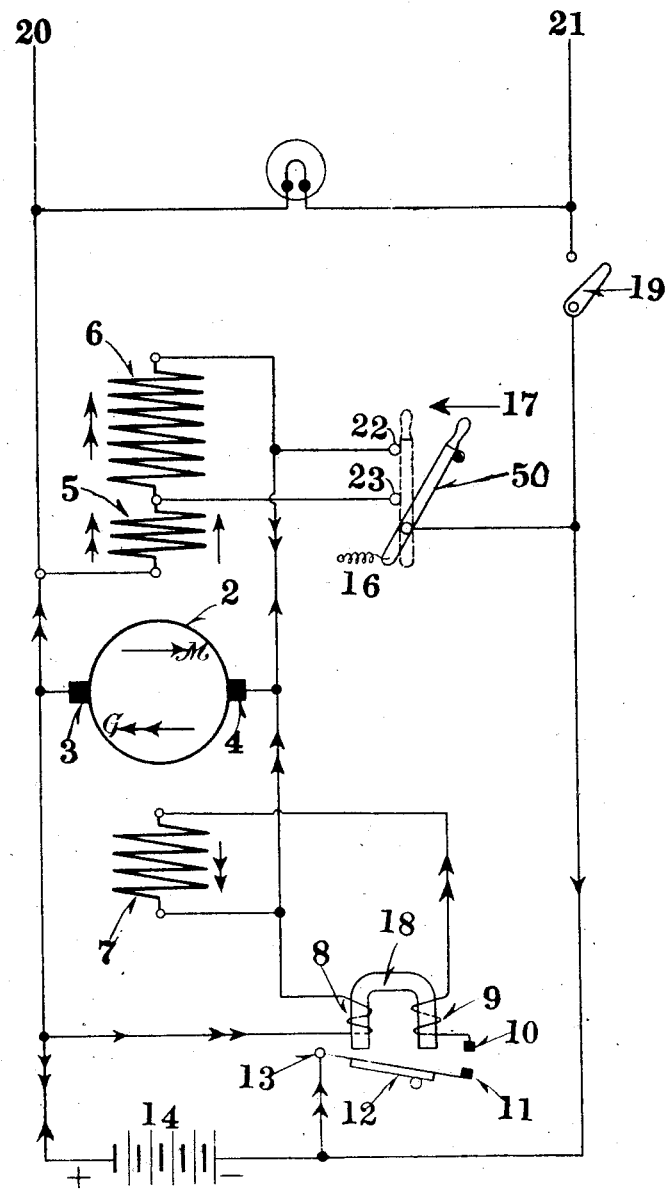

V. A. FYNN.
DYNAMO ELECTRIC MACHINE.
APPLICATION FILED MAY 13, 1912.

1,084,079.

Patented Jan. 13, 1914.
3 SHEETS—SHEET 1.

V. A. FYNN.
DYNAMO ELECTRIC MACHINE.
APPLICATION FILED MAY 13, 1912.

1,084,079.

Patented Jan. 13, 1914.

3 SHEETS—SHEET 3.

WITNESSES:
Chas. A. Becker,
G. M. Thorr

INVENTOR
Valère A. Fynn
BY
E. E. Huffman
ATTORNEY

UNITED STATES PATENT OFFICE.

VALÈRE ALFRED FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

DYNAMO-ELECTRIC MACHINE.

1,084,079.  Specification of Letters Patent.  Patented Jan. 13, 1914.

Application filed May 13, 1912.  Serial No. 697,050.

*To all whom it may concern:*

Be it known that I, VALÈRE ALFRED FYNN, a subject of the King of England, residing at St. Louis, Missouri, United States of America, have invented a certain new and useful Dynamo-Electric Machine, of which the following is such a full, clear, and exact description as will enable any one skilled in the art to which it appertains to make and use the same, reference being had to the accompanying drawings, forming part of this specification.

My invention relates to dynamo electric machines of the direct current type and, particularly, to such as are adapted to operate in conjunction with a gasolene engine and a storage battery, the dynamo electric machine being used as a motor for starting the engine from the battery and as a dynamo when driven by the engine to charge the battery. Storage batteries used on motor cars which are driven by gasolene engines are primarily designed to supply the ignition system and the lamps of the vehicle, and the voltage of such batteries is generally chosen low, seldom exceeding 12 volts. It is desirable that only the smallest possible number of storage cells be carried. The number of these cells should be determined only by the voltage required by the lamps, and connecting the cells in parallel should be avoided.

When only such a small voltage is available, it has proven difficult to devise a dynamo electric machine which will develop a sufficient torque to start the engine and to bring it up to the desired speed. This difficulty is increased if the same dynamo electric machine is to be used as a generator for charging the battery, particularly, as the charging operation should be started at the lowest possible dynamo speed. All of these very desirable results can be achieved only by changing the connections of the machine, and it is most important that these alterations in the connections be so carried out as to avoid injurious sparking.

The principal objects of my invention are to overcome the above difficulties.

Other objects and advantages will appear from the following description, taken in conjunction with the accompanying drawings.

In carrying out my invention, in one form, I provide a dynamo electric machine with two shunt windings and a series winding, the armature being suitably connected to the engine shaft. In order to operate the machine as a motor to start the engine, the storage battery is connected to the brushes and to one of the shunt windings. This winding is of low resistance and, therefore, will produce the strong magnetic field necessary to secure a large starting torque. After the engine is started, the other shunt winding is included in circuit with the first and the battery is disconnected. The machine then runs as a generator and, when the terminal voltage rises to a point where it sufficiently exceeds the voltage of the battery, a switch is automatically operated which connects the generator to the battery in the proper direction to supply a charging current. The circuits are so arranged that when the generator is connected to charge the battery, the charging current flows through the series winding which is connected to oppose the magnetization due to the shunt windings and thus limit the charging voltage.

In another form of my invention, I make use of a dynamo electric machine provided with two armatures and two commutators. In order to start the machine, I connect one of the armatures directly across the battery and include the other in the circuit with the low resistance exciting winding so as to cut down the current in said winding with increasing speed. After the machine has reached a sufficient speed, I so reorganize its circuits, without interrupting any circuits containing stored energy, as to place the two armatures in series. By these means, I can cause the machine to reach a higher speed as a motor and to pick up at a lower speed when operating as a generator.

Figure 2:
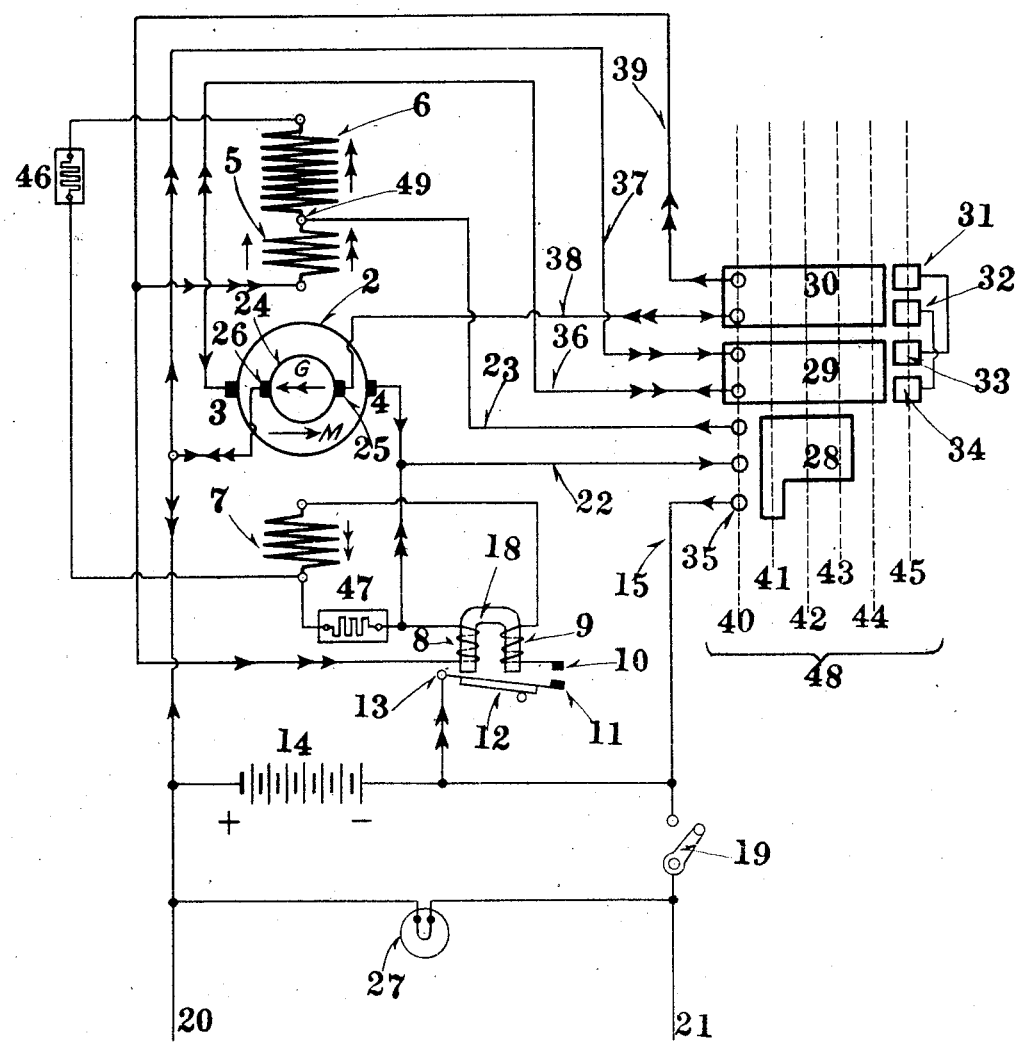
Figure 3:
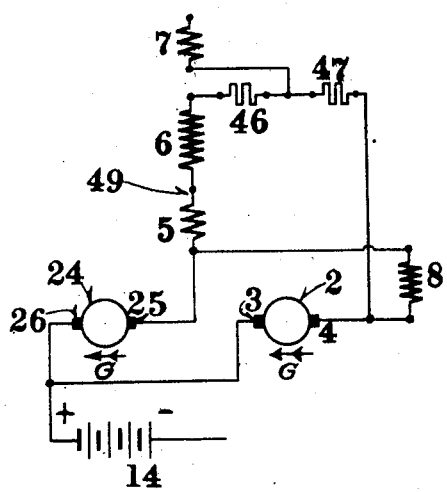
Figure 4:
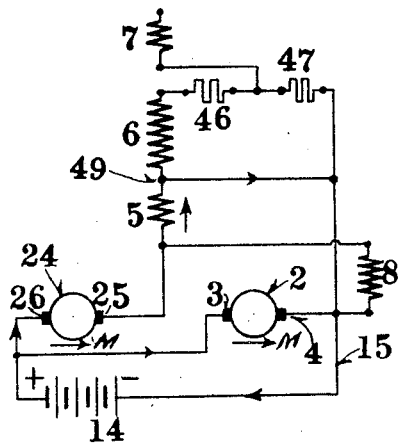

In the drawings, Figure 1 represents one embodiment of my invention. Fig. 2 illustrates a machine similar to that of Fig. 1, but in which a second armature winding is provided and is included in circuit with an exciting winding when the machine is operated as a motor. Fig. 3 represents the circuits and connections existing in the machine of Fig. 2 when the controller is in its "off" position, and Figs. 4 and 5 the circuits established when the controller is in positions 41 and 45 respectively.

Referring to Fig. 1, 2 represents the armature of the dynamo electric machine, and 3, 4, the brushes bearing on the commutator.

5 represents a low resistance shunt winding having few turns and 6 another shunt winding preferably of relatively high resistance, in series therewith, and having a large number of turns. 7 is a series winding coaxially disposed with reference to the shunt windings and provided with a relatively large number of turns. 50 represents a starting switch, by means of which the storage battery 14 may be connected to the shunt winding 5, and the winding 6 simultaneously short-circuited. 18 is an automatic charging switch provided with a circuit closing armature 12, a voltage coil 8 permanently connected in circuit with the brushes 3, 4, and a coil 9 in circuit with the series winding 7. The positive pole of the battery 14 is permanently connected to the brush 3 and to the lead 20 of the lamp circuit 20 and 21. The negative pole of the battery is permanently connected to the switch 19 controlling the lamp circuit and to the starting switch 50. This pole is also connected to the armature 12 of the automatic charging switch. The starting lever is normally held in the position shown by the spring 16, but when moved in the direction of the arrow 17, it makes contact with the points 22, 23, thus short-circuiting the shunt winding 6 and connecting the negative pole of the battery to the brush 4 and to the low resistance shunt winding 5. When the starting switch 50 is in this position, current flows from the positive pole of the storage battery through the various completed circuits, as indicated by the single headed arrows. It flows through the armature in the direction of the arrow M and returns to the negative pole of the battery by way of point 22 and lever 50. Current also flows from the positive pole of the storage battery through the shunt winding 5 and returns to the battery by way of point 23 and lever 15. With this connection, the armature takes a large current and the low resistance of the shunt field winding 5 enables a very strong field to be produced in the machine, which accordingly starts with a very powerful torque. As soon as the gasolene engine has been started, the starting lever 50 may be released, thus disconnecting the machine from the negative pole of the battery and re-instating the field coil 6 within the shunt exciting circuit without interrupting this circuit. The machine now being driven by the engine, will act as a dynamo generating a current through the armature directed as shown by the double headed arrow G. This current will flow through the shunt windings 5 and 6, and also through the coil 8 of the automatic charging switch. The E. M. F. appearing at the brushes 3, 4 of the dynamo will rise rapidly with increasing engine speed and the coil 8 is so proportioned that it will attract the armature 12 when the dynamo voltage has preferably slightly exceeded the normal value of the battery voltage. When the armature 12 is attracted, contacts 10 and 11 are brought together, thus connecting the negative pole of the battery 14 through the current coil 9 of the automatic charging switch and the series field winding 7 to the brush 4. The dynamo is now connected to charge the battery and the connections are so made that the charging current flowing through the series winding 7 produces a magnetization opposed to that due to the shunt windings 5 and 6, thus limiting the current output of the dynamo and protecting the storage battery. Should the E. M. F. generated by the dynamo decrease to a value below that of the battery E. M. F. as may happen, for example, when the speed of the engine is very much decreased, then the direction of the current through the coil 9 will be reversed and the armature 12 will drop away, thus interrupting the charging circuit at the point 10.

In Fig. 2, the armature carries two windings, 2 and 24, each connected to a commutator on which rest the brushes 3, 4 and 26, 25. The field structure carries two shunt windings 5 and 6, which, in this case, are permanently connected together, and also a series winding 7. The battery 14 is adapted to be connected to the dynamo electric machine by way of the controller 48 and the automatic switch 18. A resistance 46 is included in the circuit of the shunt winding 5, 6, and another resistance 47 is included in the charging circuit controlled by the automatic switch 18. Both of these resistances are preferably made of a material having a resistance which varies very rapidly with temperature, and may, with advantage, be inclosed in air-tight receptacles from which the air has been exhausted. A suitable material for these resistances is iron strip or wire. The automatic switch 18 closes the charging circuit through the resistance 47 and the decompounding winding 7. The controller 48 has been provided with six steps. It is made use of for reorganizing the connections of the dynamo electric machine and for connecting or disconnecting same and the storage battery. The functions of this controller can best be ascertained by following out the various connections.

The lead 15 is connected to the negative pole of the battery 14 and also to one of the stationary contacts or fingers 35 of the controller 48. In this case, there are seven such stationary contacts, the other six being connected to the leads 22, 23, 36, 37, 38 and 39 respectively. When the controller stands in the "off" position 40, which is that indicated in the figure, then the circuits are as diagrammatically shown in Fig. 3. Starting from the positive pole of the battery 14, one circuit can be traced to the brush 26 of the armature winding 24, to brush 25, through lead 38 to contact plate 30 of the controller, to lead 39, to the field winding 6, the resistance 46, the resistance 47, to brush 4, through the armature winding 2 to brush 3, and back to the positive pole of the battery 14 by way of the conductor 36, the contact plate 29 of the controller and the conductor 37. Another circuit can be traced through the two armatures, in the manner indicated, but closing through the shunt coil 8 of the automatic switch 18, instead of through the exciting windings 6 and 5, and the resistances 46 and 47. This coil 8 is permanently connected across the brushes, and is dimensioned to attract the armature 12 only when a voltage approximately equal to that of the battery is impressed on it. It will be seen that in the "off" position of the controller the shunt windings 5, 6 and 8 are all comprised within closed circuits and that the battery 14 is connected to these circuits at one point only. The local circuit comprising the two armature windings and the two field windings 5 and 6, is inoperative or dead, for the reason that the two armature windings are connected in opposition. The local circuit comprising the two armature windings and the winding 8 of the automatic switch 18, is also dead for the same reason. It is, therefore, a matter of indifference whether the dynamo electric machine is running or is at rest as long as the connections corresponding to the "off" position of the controller 48 are maintained.

When it is desired to run this machine as a motor, the controller 48 is moved into position 41, which is the "starting" position. The circuits which have been established in the "off" position are not interrupted when the controller moves to the position 41 from position 40, but the negative pole of the battery is connected to the brush 4 of the commuted winding 2 by way of the conductor 15, the contact plate 28 and the conductor 22. Simultaneously, the winding 6 is short-circuited by way of the conductor 23, the contact plate 28, the conductor 22 and the two resistances 47 and 46. The active circuits established by moving the controller to its starting position are two in number and are more clearly shown in Fig. 4. One of these can be traced from the positive pole of the battery 14 to brush 26, through the commuted winding 24 to brush 25, the conductor 38, the contact plate 30, the conductor 39, the field winding 5, the conductor 23, contact plate 28, and back to the battery by way of the conductor 15 and the negative pole 14. The other circuit can be traced from the positive pole of the battery 14 through conductor 37, the contact plate 29, the conductor 36, the brush 3, through the commuted winding 2 to the brush 4, and back to the negative pole of the battery through the conductor 22, the contact plate 28 and the conductor 15. It is seen that the commuted winding 2 is directly connected across the battery terminals, while the winding 5 is connected across the said battery in series with the armature winding 24. A very powerful torque may be obtained in this manner, with a low terminal voltage, for the effective armature ampere turns will be equal to the sum of the ampere turns in the two armature windings, while the motor field may be made as strong as desired at starting by suitably selecting the number of turns of the winding 5. The back E. M. F. generated in the armature winding 24, included in the circuit of the winding 5, reduces the current in that winding with increasing speed and thus causes the motor to reach a higher speed. It is, of course, undesirable that the automatic switch 18 be operated during the starting performance. To this end, I have so arranged the circuits that the shunt winding 8 of said switch is not connected across the full battery voltage at starting, but merely shunts the exciting winding 5, during said operation. After the gasolene engine has been brought up to a sufficiently high speed and ignition is occurring at the proper time, the controller is moved to position 42, thereby disconnecting the negative pole of the battery 14 from the dynamo electric machine, but otherwise not disturbing any of the previous connections. It will be seen that this circuit may be interrupted with impunity, for the exciting circuit 5 will not be broken by said interruption. When the controller stands in the position 42, the circuit of the exciting winding 5 is closed through the two armature windings 2 and 24, as shown in Fig. 3. It will also be noticed that the connections of the machine are left in such condition as to preclude all possibility of the combination becoming self-exciting, for the reason that the two commuted windings 2 and 24 are connected in opposition. The connections prevailing in the position 42 of the controller are not disturbed when the latter is moved into position 43, this being done for the purpose of indicating that it is desirable to maintain these connections for a very short time in order to give an opportunity for the energy stored in the magnetic field produced by the exciting winding 5 to be dissipated in the closed circuits provided for the purpose. When the controller is moved to position 44, the closed circuit comprising the exciting winding 6 and the resistances 46, 47, is interrupted by the contact plate 28 breaking connection between the conductors 22 and 23, and thus reëstablishing the connections which existed in the "off" position. The interruption of this connection may be accomplished with perfect safety and without any danger of sparking, since the energy stored in the magnetic field produced by the winding 5, at starting, has, by that time, had every opportunity of expending itself. Any possible risk in this direction is further reduced by the fact that the interruption of this connection does not interrupt the circuit of the exciting winding 5, but merely introduces additional resistance into it. Having reëstablished the original connections in which the dynamo is not self-exciting, it would be perfectly safe to interrupt any of the dynamo circuits in order to reorganize them for the purpose of making the dynamo available for charging the battery. Instead of doing this, I prefer to establish these generating connections by momentarily short-circuiting one of the armature windings. To this end, the contact plates 29, 30, of the controller are placed so close to the contact plates 31, 32, 33 and 34 thereof that none of the circuits are interrupted when the controller passes from position 44 to position 45. In this last position, the battery 14 is not connected to the dynamo electric machine through the controller, but may be connected thereto by the automatic switch 18, as will appear hereafter.

Figure 5:
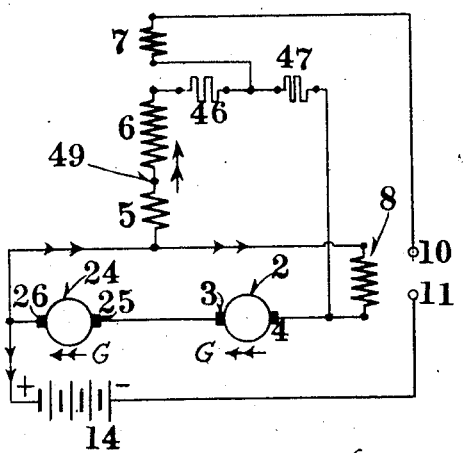

The dynamo circuits, for the position 45 of the controller are shown in Fig. 5. They can be traced from brush 26 through conductor 37 to the contact 33, contact 31, conductor 39, exciting windings 5 and 6, the resistance 46, resistance 47, to brush 4, through the commuted winding 2 to brush 3, to conductor 36, to contact 34, and back to the commuted winding 24 by way of the contact 32, the conductor 38 and the brush 25. This circuit being established, the dynamo becomes self-exciting. The aforesaid reorganization of the circuits has also brought about the connection of the shunt winding 8 of the automatic switch 18 in parallel with both commuted windings. This circuit may be traced from brush 26, through conductor 37, to contact 33, to contact 31, through conductor 39, through shunt winding 8, to brush 4, through the commuted winding 2, to brush 3, through conductor 36, to contact 34, to contact 32, and back to the commuted winding 24 through conductor 38, and brush 25. As soon as the terminal voltage of the machine has reached a value slightly exceeding that of the storage battery 14, the armature 12 of the automatic switch 18 is attracted and closes the charging circuit at the points 10 and 11, thus connecting the battery 14 across the two commuted windings 2 and 24 in series, the negative pole of said battery being connected to brush 4 by way of the armature 12 pivoted at 13, the contacts 11 and 10, the series winding 9 of the automatic switch 18, the decompounding winding 7 of the dynamo, and the main resistance 47. In this running connection, the current output of the dynamo is limited by the combination of the actions due to the main resistance 47 and the decompounding winding 7. The decompounding winding 7 reduces the total magnetization of the dynamo and thus reduces its output. The shunt windings 5 and 6 being connected across the two armature windings 2 and 24, and across the main resistance 47, the voltage available for the shunt excitation also decreases with increasing load, because the drop or ohmic loss in the resistance 47 increases with the load. Both of these features tend to restrict the output or the current delivered by the dynamo, irrespective of the speed at which it is driven. While it is quite advantageous to make use of the resistance 47 in combination with the decompounding winding 7, yet one or the other of these elements may be dispensed with. The main object of the resistance 46, included in the shunt circuit, is to safeguard the machine in case the automatic switch 18 should fail to operate. In such case, the voltage of the dynamo would rise very rapidly increasing the shunt current to an extent which would be quite likely to permanently damage these windings. I avoid this danger by inserting the resistance 46 into this circuit, and I prefer to make this resistance of a material such as iron wire, the resistance of which will rise very rapidly after a certain temperature has been exceeded. I prefer to make use of the same sort of resistance in the main charging circuit at 47 and to inclose the resistance coils in an airtight receptacle from which the air has been exhausted, so as to prevent the material from burning when raised to a high temperature.

Many modifications in details of the apparatus described may be made without departing from the spirit of my invention, and I do not desire that it be limited otherwise than by the appended claims.

I claim:

1. The combination with a dynamo electric machine having two shunt windings and a series winding, of an accumulator, means for connecting the armature and only one shunt winding in circuit with the accumulator for running the machine as a motor, means for connecting the second shunt winding in series with the first, and means for connecting the series winding in opposition to the shunt windings for operating the machine as a generator to charge the accumulator.

2. In combination, a dynamo electric machine having two shunt windings, an accumulator, a switch for connecting the armature and one shunt winding in circuit with the accumulator for running the machine as a motor, means for including the other shunt winding in circuit with the armature and in series with the first shunt winding, and means for limiting the current output of the machine when run as a generator for charging the accumulator.

3. In combination, a dynamo electric machine having two shunt windings permanently connected in series, an accumulator and a switch for connecting the armature and one shunt winding in circuit with the accumulator for running the machine as a motor, means for including the other shunt winding in circuit with the armature, and means for limiting the output of the machine when run as a generator for charging the accumulator.

4. The combination with an accumulator, of a dynamo electric machine having a low resistance shunt winding and a series winding, means for connecting the armature and the low resistance shunt winding in circuit with the accumulator and short-circuiting the high resistance shunt winding to run the machine as a motor, and means for connecting the series winding in circuit with the accumulator and in opposition to the shunt windings for operating the machine as a generator to charge the accumulator.

5. In combination, a dynamo electric machine having a series winding and two shunt windings permanently connected in series across the brushes, an accumulator, a starting switch adapted to connect the accumulator to one of the shunt windings and simultaneously short-circuit the other shunt winding, and automatic means for connecting the series winding in circuit with the armature and in opposition to the shunt windings.

6. In a dynamo electric machine, the combination with a source of current, of a series winding, a shunt winding, and two armature windings, said armature windings being connected to the source in two parallel circuits, one of said circuits including the series winding and one armature winding and the other including the second armature winding to operate the machine as a motor, and means for connecting the armature windings in series with each other and the shunt winding in parallel to at least part of one armature winding to operate the machine as a generator to return energy to the source.

7. In a dynamo electric machine, the combination with a source of low voltage current, of a field winding and two armature windings, said armature windings being connected to the source in parallel circuits to start and operate the machine as a motor, means for connecting the armature windings in series with each other and the field winding in parallel to at least part of the armature circuit to operate the machine as a generator.

In testimony whereof, I have hereunto set my hand and affixed my seal in the presence of the two subscribing witnesses.

VALÈRE ALFRED FYNN. [L. S.]

Witnesses:
W. A. ALEXANDER,
G. M. SHORE.